US008329111B2

(12) United States Patent
Mizutani

(10) Patent No.: US 8,329,111 B2
(45) Date of Patent: Dec. 11, 2012

(54) HONEYCOMB FILTER AND METHOD FOR MANUFACTURING THE SAME

(75) Inventor: Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 611 days.

(21) Appl. No.: 12/552,880

(22) Filed: Sep. 2, 2009

(65) Prior Publication Data

US 2009/0324455 A1 Dec. 31, 2009

Related U.S. Application Data

(63) Continuation of application No. PCT/JP2009/051466, filed on Jan. 29, 2009.

(30) Foreign Application Priority Data

Feb. 5, 2008 (JP) ................................ 2008-025285

(51) Int. Cl.
*B01D 50/00* (2006.01)

(52) U.S. Cl. ...................................................... 422/180

(58) Field of Classification Search .................. 422/177, 422/180; 428/116; 55/523
See application file for complete search history.

(56) References Cited

U.S. PATENT DOCUMENTS

| | | | | |
|---|---|---|---|---|
| 5,219,667 | A * | 6/1993 | Hampton | 428/593 |
| 5,629,067 | A * | 5/1997 | Kotani et al. | 428/116 |
| 2005/0166729 | A1 | 8/2005 | Nishio et al. | |
| 2006/0121240 | A1* | 6/2006 | Hirai et al. | 428/116 |
| 2007/0196248 | A1 | 8/2007 | Mizutani | |
| 2007/0245702 | A1 | 10/2007 | Kawata et al. | |
| 2009/0022942 | A1 | 1/2009 | Hiramatsu et al. | |

FOREIGN PATENT DOCUMENTS

| | | |
|---|---|---|
| EP | 1 741 686 A1 | 1/2007 |
| JP | A 2003-154223 | 5/2003 |
| JP | A 2003-291054 | 10/2003 |
| JP | A 2007-216165 | 8/2007 |
| WO | WO 00/01463 A1 | 1/2000 |
| WO | WO 2007/091688 A1 | 8/2007 |

OTHER PUBLICATIONS

Kadla et al., "Micropatterned Thin Film Honeycomb Materials from Regiospecifically Modified Cellulose,"*Biomacromolecules*, vol. 8, pp. 161-165, Oct. 12, 2006.

Supplementary European Search Report issued in Application No. 07907552.7; Dated Jul. 15, 2011.

Overview of X-ray Fluorescence, James M. Guthrie, pp. 1-8. http://archaeometry.missouri.edu/xrf_overview.html, Jun. 15, 2012.

Aug. 17, 2012 European Office Action issued in European Application No. 09 707 552.7.

* cited by examiner

*Primary Examiner* — Tom Duong
(74) *Attorney, Agent, or Firm* — Oliff & Berridge, PLC

(57) ABSTRACT

A honeycomb filter including a catalyst-carrying article, and an outer peripheral coat layer disposed on an outer peripheral face of the catalyst carrying article, wherein an amount of the catalyst loaded in the outer peripheral coat layer at a position 50 μm or more apart from a boundary face between the catalyst-carrying article and the outer peripheral coat layer is 5 mass % or less when a measurement piece having a cross section where a boundary portion between the catalyst-carrying article and the outer peripheral coat layer can be observed and being obtained by embedding a resin in the boundary portion in the cross section is measured by an energy dispersive fluorescent X-ray analysis using a scanning electron microscope.

4 Claims, 3 Drawing Sheets

HONEYCOMB FILTER AND METHOD FOR MANUFACTURING THE SAME

This is a Continuation of International Application No. PCT/JP2009/051466 filed Jan. 29, 2009. The disclosure of the prior application is hereby incorporated by reference herein in its entirety.

TECHNICAL FIELD

The present invention relates to a honeycomb filter and a method for manufacturing the honeycomb filter. More specifically, the present invention relates to a honeycomb filter where a catalyst hardly deposits in the outer peripheral coat layer and where the catalyst hardly aggregates on the partition walls separating and forming the outermost peripheral cells, and the method for manufacturing the honeycomb filter.

BACKGROUND ART

In order to trap dust and other particulate matter contained in automobile exhaust gas and incineration exhaust gas generated upon incineration of waste products, a ceramic honeycomb filter is used. In particular, in order to efficiently remove particulate matter (hereinafter referred from time to time as "PM") such as soot disposed from an internal combustion engine, a diesel particulate filter (hereinafter referred from time to time as "DPF").

Since the DPF is finally clogged if trapped PM is not removed, it is necessary to remove the trapped PM for regeneration. The regeneration of the DPF can be performed generally by heating the DPF itself to combust PM. As a method for regenerating a DPF, for example, there is a method where an oxidation type catalyst is loaded to effectively combust PM by high temperature exhaust gas from a diesel engine.

When a catalyst is loaded on the DPF, the catalyst is generally loaded on the whole partition walls. By loading the catalyst on the whole partition wall, PM can effectively be combusted over the whole DPF. However, since temperature rises from an end portion (inlet side end portion) where exhaust gas flows in the DPF toward the end portion (outlet side end portion) where the exhaust gas flows out from the DPF, there arises a problem of catalyst deterioration in the vicinity of the outlet side endportion, crack generation in the partition wall, or melting of the partition wall when temperature in the vicinity of outlet side end portion of the DPF excessively rises.

To cope with this, there is disclosed a method to solve a problem of catalyst deterioration in the vicinity of the outlet side end portions of the DPF or the like by reducing the amount of the catalyst to be loaded or by loading no catalyst (see, e.g., Patent Document 1).

In addition, there arose a problem of insufficient regeneration efficiency in the case of repeated regeneration, there is disclosed a honeycomb filter capable of suppressing catalyst deterioration, crack regeneration of the partition wall, and melting of the partition wall and capable of enhancing regeneration efficiency upon regeneration (see, e.g., Patent Document 2).

Patent Document 1: JP-A-2003-154223

Patent Document 2: JP-A-2007-216165

DISCLOSURE OF THE INVENTION

A conventional honeycomb filter is manufactured by loading a catalyst on porous partition walls after an outer peripheral coat layer is disposed on the outer peripheral face. In this manufacturing method, when a surplus catalyst loaded on the porous partition walls is removed by air blow or the like, there is a case that the catalyst deposits in the outer peripheral coat layer since air passing through the cells flows toward the outer peripheral coat layer in the outermost peripheral cells.

The present invention has been achieved in view of such problems of prior art and aims to provide a honeycomb filter where a catalyst hardly deposits in the outer peripheral coat layer and where the catalyst hardly aggregates on the partition walls separating and forming the outermost peripheral cells.

In addition, the present invention aims to provide a method for manufacturing a honeycomb filter where a catalyst hardly deposits in the outer peripheral coat layer and where the catalyst hardly aggregates on the partition walls separating and forming the outermost peripheral cells.

As a result of extensive studies in order to achieve the aforementioned aims, the inventors of the present invention found that the aforementioned aims can be achieved by manufacturing a honeycomb filter in a predetermined process, which led to the present invention.

That is, according to the present invention, the following honeycomb filter and the method for manufacturing the honeycomb filter are provided.

[1] A honeycomb filter comprising a catalyst-carrying article where a plurality of honeycomb segments each is provided with a sell structure having a plurality of cells separated and formed by porous partition walls and an outer wall disposed in the outer periphery of the cell structure constitute a bonded article obtained by bonding the plurality of honeycomb segments at the outer wall and where a catalyst is loaded on the partition walls of a periphery-ground article obtained by grinding an outer peripheral portion of the bonded article, and an outer peripheral coat layer disposed on an outer peripheral face of the catalyst carrying article; wherein an amount of the catalyst loaded in the outer peripheral coat layer at a position 50 um or more apart from a boundary face between the catalyst-carrying article and the outer peripheral coat layer is 5 mass % or less, mass % being a percentage of a mass of the catalyst in the outer peripheral coat layer, when a measurement piece having a cross section where a boundary portion between the catalyst-carrying article and the outer peripheral coat layer can be observed and being obtained by embedding a resin in the boundary portion in the cross section is measured by an energy dispersive fluorescent X-ray analysis using a scanning electron microscope.

[2] The honeycomb filter according to [1], wherein the amount of the catalyst loaded in the outer peripheral coat layer at a position 50 μm or more apart from the boundary face is 1 mass % or less when the amount of catalyst loaded in the measurement piece is measured by the energy dispersive fluorescent X-ray analysis using a scanning electron microscope.

[3] The honeycomb filter according to [1], wherein no catalyst is detected in the outer peripheral coat layer at a position 50 μm or more apart from the boundary face when the amount of catalyst loaded in the measurement piece is measured by the energy dispersive fluorescent X-ray analysis using a scanning electron microscope.

[4] The honeycomb filter according to any one of [1] to [3], wherein a ratio of an amount of the catalyst in the range within 50 μm from the boundary face of the catalyst-carrying article and the outer peripheral coat layer of the partition walls separating and forming the cells in an outermost periphery to an amount of the catalyst in the partition walls separating and forming the cells other than the cells in the outermost periphery is below 30 mass %.

[5] A method for manufacturing a honeycomb filter comprising: a step (1) where a bonding article is obtained by bonding a plurality of honeycomb segments each having a cell structure having a plurality of cells separated and formed by porous partition walls and an outer wall disposed in the outer periphery of the cell structure at the outer wall, followed by grinding an outer peripheral portion of the bonding article to obtain a periphery-ground article, a step (2) where a catalyst-carrying article is obtained by loading a catalyst on the partition wall of the periphery-ground article, and a step (3) where an outer peripheral coat layer is disposed on the outer peripheral face of the catalyst-carrying article to obtain an outer periphery-coated article.

[6] The method for manufacturing a honeycomb filter according to [5], further comprising a step (4) where the outer periphery-coated article is heated to fix the catalyst on the partition walls after the step (3).

The honeycomb structure of the present invention exhibits effects that a catalyst hardly deposits in the outer peripheral coat layer and that the catalyst hardly aggregates on the partition walls separating and forming the outermost peripheral cells. Therefore, when PM is combusted by heating the DPF, crack generation due to local temperature rise generated in the DPF can be inhibited.

In addition, the method for manufacturing a honeycomb filter of the present invention exhibits effects of being capable of manufacturing a honeycomb filter where a catalyst hardly deposits in the outer peripheral coat layer and where the catalyst hardly aggregates on the partition walls separating and forming the outermost peripheral cells. Therefore, a minimal amount of a catalyst is loaded, which can reduce production costs.

DESCRIPTION OF REFERENCE NUMERALS

Figure 1:
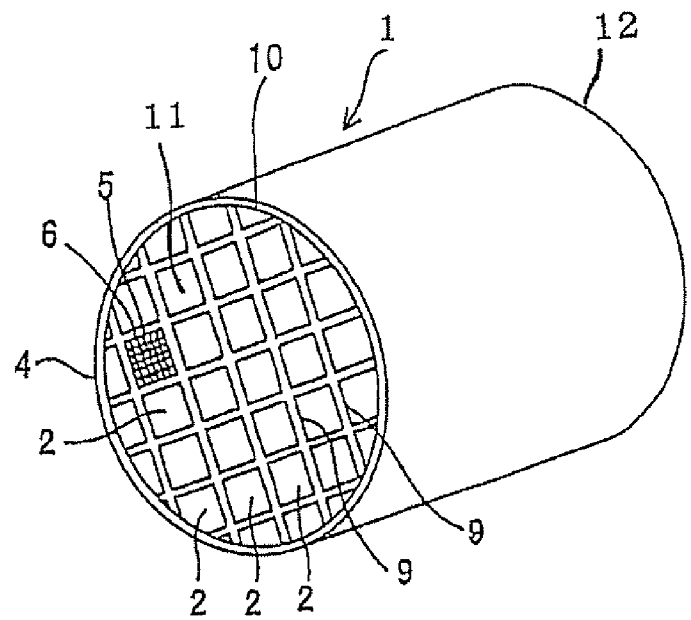
FIG. 1 is a perspective view schematically showing an embodiment of the honeycomb filter of the present invention.

1: honeycomb filter, 2: honeycomb segment, 4: outer peripheral coat layer, 5: cells, 6: partition wall, 7: plugging portions, 8: outer wall, 9: bonding material layer, 10: outer peripheral face, 11, 12: end face, 20: first plane, 21: second plane, 23: disposition jig, 24: bonding material, 25: pad

BEST MODE FOR CARRYING OUT THE INVENTION

The embodiments for carrying out the present invention are described below. However, the present invention is not restricted to the following embodiments and it should be construed that there are also included, in the present invention, those embodiments in which appropriate changes, improvements, etc. have been made to the following embodiments based on the ordinary knowledge possessed by those skilled in the art, as long as there is no deviation from the gist of the present invention.

(1) Honeycomb Filter

A honeycomb filter of the present invention is provided with a catalyst-carrying article and an outer peripheral coat layer. In addition, in the honeycomb filter of the present invention, an amount of the catalyst loaded in the outer peripheral coat layer at a position 50 μm or more apart from a boundary face between the catalyst-carrying article and the outer peripheral coat layer is 5 mass % or less, preferably 1 mass % or less, when a measurement piece having a cross section where a boundary portion between the catalyst-carrying article and the outer peripheral coat layer can be observed and being obtained by embedding a resin in the boundary portion in the cross section is measured by an energy dispersive fluorescent X-ray analysis using a scanning electron microscope. In addition, it is further preferable that no catalyst is detected in the outer peripheral coat layer at a position 50 μm or more apart from the boundary face when the amount of catalyst loaded in the measurement piece is measured by the energy dispersive fluorescent X-ray analysis using the scanning electron microscope. Therefore, it can be said that the catalyst hardly deposits in the outer peripheral coat layer in the honeycomb filter of the present invention. Incidentally, the "boundary face" here means a face abutting against the catalyst-carrying article of the outer peripheral coat layer when the catalyst-carrying article and the outer peripheral coat layer are in close contact with each other and a face facing the catalyst-carrying article of the outer peripheral coat layer when the catalyst-carrying article and the outer peripheral coat layer are not in close contact with each other.

Further, in the honeycomb filter of the present invention, the ratio of the amount of the catalyst (hereinafter referred from time to time as the "catalyst ratio") in the range within 50 μm from the boundary face of the catalyst-carrying article and the outer peripheral coat layer of the partition walls separating and forming the cells in an outermost periphery to the amount of the catalyst in the partition walls separating and forming the cells other than the cells in the outermost periphery is preferably below 30 mass %, more preferably below 20 mass %, particularly preferably below 10 mass %, most preferably below 1 mass %. Therefore, in the honeycomb filter of the present invention, it can be said that a catalyst hardly aggregates on the partition walls separating and forming the outermost peripheral cells. Incidentally, the "amount of the catalyst to be loaded" is measured by the energy dispersive fluorescent X-ray analysis. In addition, the "boundary face" here means a face abutting against the outer peripheral coat layer of the catalyst-carrying article when the catalyst-carrying article and the outer peripheral coat layer are in close contact with each other and a face facing the outer peripheral coat layer of the catalyst-carrying article when the catalyst-carrying article and the outer peripheral coat layer are not in close contact with each other.

In the honeycomb filter of the present invention, since a catalyst hardly deposits in the outer peripheral coat layer, and the catalyst hardly aggregates on the partition walls separating and forming the outermost peripheral cells, when PM is combusted by heating the DPF, crack generation due to local temperature rise generated in the DPF can be inhibited.

Here, the honeycomb filter of the present invention will be described with referring to drawings. FIG. 1 is a perspective view schematically showing an embodiment of the honeycomb filter of the present invention, and FIG. 2 is a partial front view of the honeycomb filter shown in FIG. 1, viewed from an end face side.

In FIG. 1, the honeycomb filter 1 has honeycomb segments 2 each provided with a cell structure having a plurality of cells 5 separated and formed by the porous partition walls 6 where a catalyst is loaded and an outer wall disposed in the outer periphery of the cell structure, bonding layers 9 obtained by bonding a plurality of honeycomb segments 2 at the outer wall of each of them, an outer peripheral face 10 obtained by grinding the outer peripheral portion of the bonded article, and an outer peripheral coat layer 4 disposed on the outer peripheral face 10. Incidentally, in FIG. 1, the honeycomb filter 1 has a columnar shape. However, the shape of the honeycomb filter of the present invention is not limited to the columnar shape and may suitably be selected as necessary.

Figure 2:
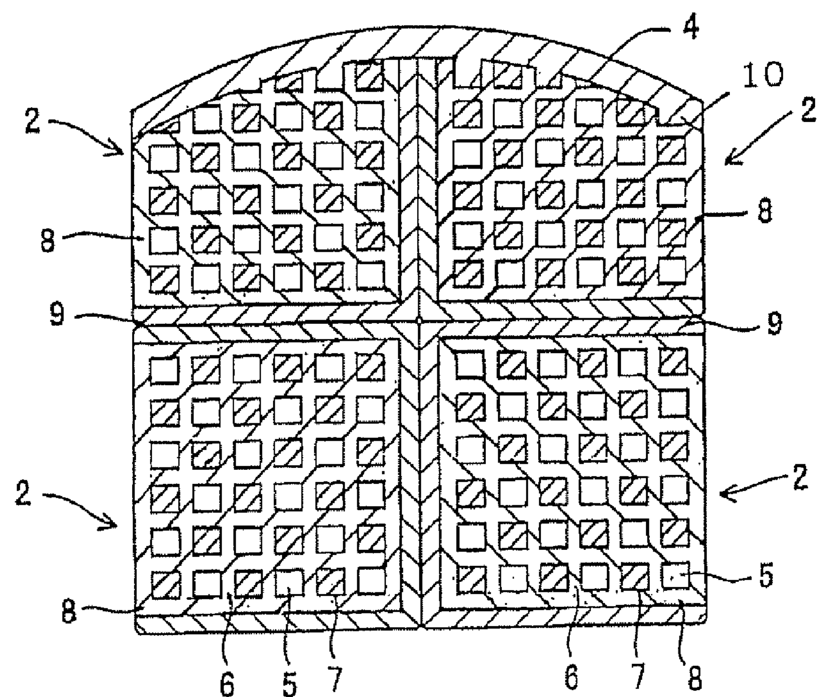
FIG. 2 is a partial front view of the honeycomb filter shown in FIG. 1, viewed from an end face side.

In FIG. 2, the honeycomb filter 1 has honeycomb segments 2 each provided with the cell structure having a plurality of cells 5 separated and formed by the porous partition walls 6 where the catalyst is loaded and the outer wall disposed in the outer periphery of the cell structure, bonding layers 9 obtained by bonding a plurality of honeycomb segments 2 at the outer wall of each of them, the outer peripheral face 10 obtained by grinding the outer peripheral portion of the bonded article, and an outer peripheral coat layer 4 disposed on the outer peripheral face 10. Incidentally, in the cells 5, plugging portions 7 are formed in such a manner that one end face and the other end face show complementary checkerwise patterns.

(1-1) Catalyst-Carrying Article

In the catalyst-carrying article, a plurality of honeycomb segments each is provided with the sell structure having a plurality of cells separated and formed by porous partition walls and the outer wall disposed in the outer periphery of the cell structure constitute the bonded article obtained by bonding the honeycomb segments at the outer wall, and a catalyst is loaded on the partition walls of the periphery-ground article obtained by grinding the outer peripheral portion of the bonded article.

(Periphery-Ground Article)

In the periphery-ground article, the outer peripheral portion of the bonded article is ground. The shape of the outer peripheral portion due to grinding is not particularly limited, and an arbitrary shape can be employed.

(Bonded Article)

The bonded article is constituted by bonding a plurality of honeycomb segments with a bonding material at the outer wall of each of them. Though the number of the honeycomb segments to be bonded together is not particularly limited, it is generally about 9 to 16.

(Honeycomb Segment)

The honeycomb segment is provided with the cell structure having a plurality of cells separated and formed by porous partition walls and the outer wall disposed in the outer periphery of the cell structure. The cells separated and formed by the porous partition walls communicate between two end faces of the honeycomb segment and functions as fluid passages.

The material for the honeycomb segment is preferably porous and more preferably has an average pore diameter of 5 to 40 μm and a porosity of 30 to 85%. More specifically, from the view point of strength and thermal resistance, there is preferably employed as the material at least one kind selected from the group consisting of silicon carbide (SiC), silicon-silicon carbide based composite material using silicon carbide (SiC) as the aggregate and silicon (Si) as the bonding material, silicon nitride, cordierite, mullite, alumina, spinel, silicon carbide-cordierite composite material, lithium aluminum silicate, aluminum titanate, and Fe—Cr—Al type metal. Of these, it is further preferable to use silicon carbide and silicon-silicon carbide composite material. When the honeycomb filter is manufactured by using honeycomb segments of silicon-silicon carbide based composite material, generally, a silicon dioxide film is formed on the surface of the silicon-silicon carbide. Since the melting point of silicon dioxide is higher than that of silicon, partition walls can be inhibited from melting by the silicon dioxide surface protection film even in the case that the temperature of the honeycomb structure rises and exceeds the melting point of silicon. Incidentally, the average pore diameter is measured by a method in "the whole pore capacity and median pore diameter described in 6.3 of a test method M505-87 for an automobile exhaust gas purification catalyst ceramic monolith carrier of JASO (Japanese Automobile Standards Organization)", and the porosity is calculated from the pore capacity.

Regarding the cell structure, the thickness of the porous partition wall is preferably 6 to 70 nil, more preferably 8 to 30 mil, particularly preferably 10 to 20 mil. In addition, the cell structure preferably has a cell density of 50 to 400 cpsi, more preferably 70 to 370 cpsi, particularly preferably 80 to 320. When the partition wall thickness is below 6 mil, strength may be low. On the other hand, when it is above 70 mil, the engine output may be reduced due to too high pressure loss. When the cell density is below 50 cpsi, the strengthmaybe low. On the other hand, when it is above 400 cpsi, the engine output may be reduced due to too high pressure loss.

Plugging portions are formed in the cells separated and formed by the porous partition walls in such a manner that one end face and the other end face show complementary checkerwise patterns. By such plugging in the cells, when a fluid flows inside the DPF using of the honeycomb filter of the present invention, the fluid does not pass through the communicating space between the end faces and has to pass through the porous partition walls at least once. When the fluid passes through the porous partition walls, PM contained in the fluid is removed.

Figure 3:
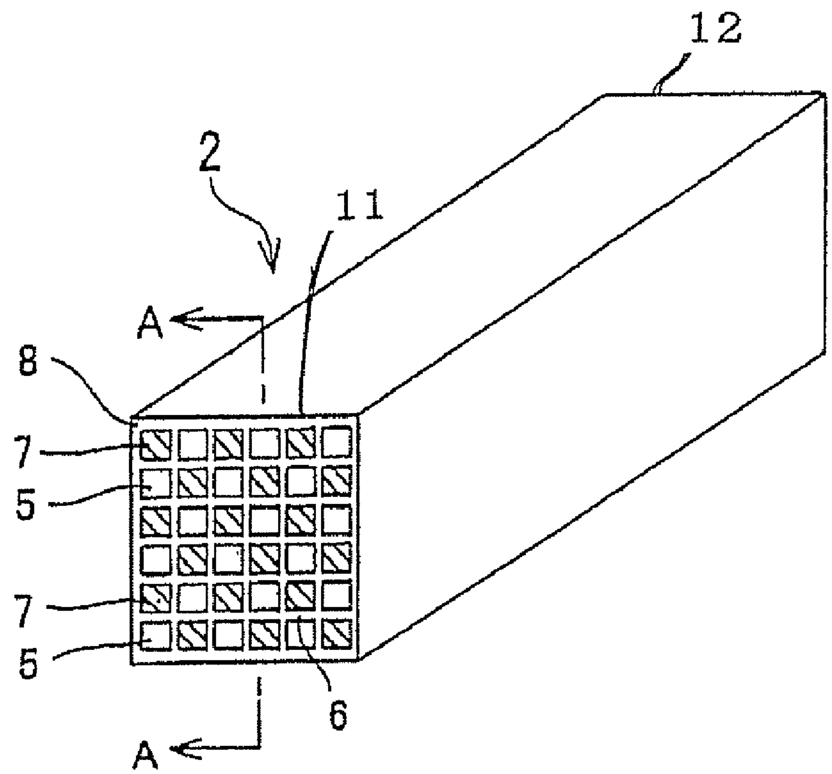
FIG. 3 is a perspective view schematically showing an example of the honeycomb segment constituting the honeycomb filter of the present invention.

The honeycomb segment will be described with referring to FIG. 3. FIG. 3 is a perspective view schematically showing an example of the honeycomb segment constituting the honeycomb filter of the present invention.

The honeycomb segment 2 is provided with the cell structure having a plurality of cells 5 separated and formed by the porous partition walls 6 and the outer wall 8 disposed in the outer periphery of the cell structure and has a honeycomb shape. In the cells 5, plugging portions 7 are formed in such a manner that one end face and the other end face show complementary checkerwise patterns.

Incidentally, in FIG. 3, the shape of honeycomb segment 2 is prismatic columnar shape. However, the shape of the honeycomb segment is not limited to the prismatic columnar shape, and the shape may suitably be selected as necessary.

(Bonding Material)

The bonding material is used to bond a plurality of honeycomb segments at the outer wall of each of them, and the constituents preferably contain as the main components a filler containing ceramic fibers having thermal resistance, ceramic particles and the like and an inorganic adhesive agent such as colloidal silica.

(Catalyst)

The catalyst is not particularly limited as long as PM can be combusted by heat of exhaust gas. For example, a simple substance selected from the noble metal elements, the elements in the group VIa of the periodic table, and the elements in the group VIII of the periodic table, or a compound thereof can be used. More specifically, a simple substance or a compound containing an element such as platinum (Pt), palladium (Pd), rhodium (Rh), nickel (Ni), cobalt (Co), molybdenum (Mo), tungsten (W), cerium (Ce), Copper (Cu), vanadium (V), iron (Fe), gold (Au), and silver (Ag). In addition, a NOx selective reduction catalyst component or a NOx adsorber catalyst component may be used.

The concentration of the catalyst loaded on the partition walls is preferably 5 to 250 g/L, more preferably 10 to 100 g/L, particularly preferably 15 to 50 g/L. When the concentration of the catalyst is below 5 g/L, there is a case that PM cannot be combusted and removed sufficiently. On the other hand, when the concentration of the catalyst is above 250 g/L, pressure loss may extremely increase, or the costs may be high. Incidentally, the concentration of the catalyst can be calculated by cutting out a block having a certain volume from the honeycomb filter and dividing the mass difference before and after loading of the catalyst by the volume.

The ratio of the catalyst is preferably below 30 mass %, more preferably below 20 mass %, particularly preferably below 10 mass %, and most preferably below 1 mass %. By such a range, surplus catalyst is not loaded, and production costs can be reduced.

(1-2) Outer Peripheral Coat Layer

The outer peripheral coat layer is disposed on the outer peripheral face of the catalyst-carrying article. The amount of the catalyst loaded in the outer peripheral coat layer at a position 50 μm or more apart from a boundary face between the catalyst-carrying article and the outer peripheral coat layer is 5 mass % or less, preferably 1 mass % or less, when a measurement piece having a cross section where a boundary portion between the catalyst-carrying article and the outer peripheral coat layer can be observed and being obtained by embedding a resin in the boundary portion in the cross section is measured by the energy dispersive fluorescent X-ray analysis using a scanning electron microscope. It is more preferable that no catalyst is detected in the outer peripheral coat layer at a position 50 μm or more apart from the boundary face when the amount of catalyst loaded in the measurement piece is measured by the energy dispersive fluorescent X-ray analysis using a scanning electron microscope.

As the coating material used for the outer peripheral coat layer, slurry of fireproof particles is preferably used.

A cross section is not limited as long as the boundary portion between the catalyst-carrying article and the outer periphery coat layer is observable and may be, for example, a cross-sectional face generated by cutting in parallel with the end face of the honeycomb filter.

The resin embedded in the boundary portion between the catalyst-carrying article and the outer peripheral coat layer in the cross-sectional face can be prepared, for example, by mixing “SpeciFix (Epoxy Type Resin)” (trade name) produced by Struers A/C and “SpeciFix-20 (Resin Hardner)” (trade name) produced by Struers A/C and hardening the mixture. Incidentally, when the observation is performed with a scanning electron microscope, it is preferable that the polished face obtained by polishing the face to be observed is observed.

The scanning electron microscope used in the measurement and the energy dispersive fluorescent X-ray analysis are not particularly limited. An example of the scanning electron microscope is “S-3200N” (trade name) produced by Hitachi, Ltd. An example of the energy dispersive fluorescent X-ray analysis is “EMAX-5770W” (trade name) produced by Horiba, Ltd.

(2) Method for Manufacturing Honeycomb Filter

The method for manufacturing the honeycomb filter of the present invention is provided with the step (1) where the bonding article is obtained by bonding a plurality of honeycomb segments each having a cell structure having a plurality of cells separated and formed by porous partition walls and the outer wall disposed in the outer periphery of the cell structure at the outer wall, followed by grinding the outer peripheral portion of the bonding article to obtain a periphery-ground article, the step (2) where a catalyst-carrying article is obtained by loading the catalyst on the partition wall of the periphery-ground article, and the step (3) where the outer peripheral coat layer is disposed on the outer peripheral face of the catalyst-carrying article to obtain the outer periphery-coated article. In addition, in the manufacturing method, the step (4) where the outer periphery-coated article is heated to fix the catalyst on the partition walls can be performed after the step (2) or the step (3). However, the step (4) is preferably performed after the step (3). This is because carbon dioxide generated and the costs such as a heating cost and the like can be reduced by reducing the number of the thermal treatment steps for one time.

(2-1) Step (1)

The step (1) is a step where the bonding article is obtained by bonding a plurality of honeycomb segments each having a cell structure having a plurality of cells separated and formed by porous partition walls and the outer wall disposed in the outer periphery of the cell structure at the outer wall, followed by grinding the outer peripheral portion of the bonding article to obtain the periphery-ground article. The use of the bonded article where a plurality of honeycomb segments are bonded at the outer wall of each of them enables to reduce thermal stress and inhibit crack generation when uneven temperature distribution is generated in the bonded article by being exposed to rapid temperature change of exhaust gas or local heat generation. In addition, since the outer peripheral portion of the bonding article is ground, the honeycomb filter of the present invention can have an arbitrary shape.

(Method for Manufacturing Bonding Article)

Figure 5:
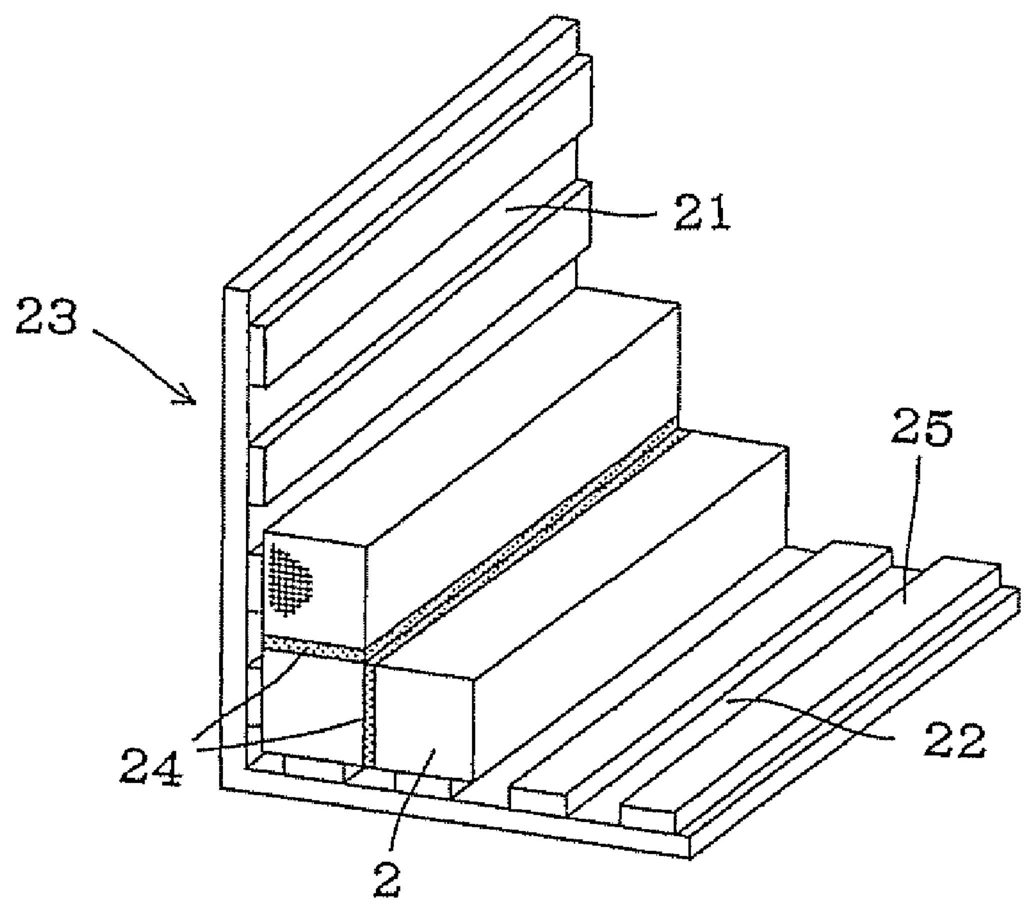
FIG. 5 is a perspective view showing a method for disposing honeycomb segments using a disposition jig.

The bonded article is manufactured by bonding a plurality of honeycomb segments at the outer wall of each of them. An example of the bonding method is a method described in JP-A-2000-279729. More specifically, using a disposition jig 23 having two planes (the first plane 20 and the second plane 21) meeting at a right angle as shown in FIG. 5, a pasty bonding material 24 is applied on an outer wall of each of the honeycomb segments 2 on the disposition jig 23, the honeycomb segments are arranged in parallel with the first plane 20 and the second plane 21 in predetermined positions, pressure is applied, and the bonding material 24 is dried and hardened. Incidentally, a pad 25 brought into contact with the honeycomb segments 2 may be provided on the first plane 20 and the second plane 21 as necessary.

(Method for Manufacturing Honeycomb Segment)

The honeycomb segment can be manufactured by the use of a conventionally known method. More specifically, to a material for the honeycomb segment are added a binder such as methyl cellulose, hydroxypropoxyl cellulose, hydroxyethyl cellulose, carboxymethyl cellulose, and polyvinyl alcohol, a pore former, a surfactant, water as a solvent, and the like; they are kneaded to prepare kneaded clay having plasticity; the kneaded clay is formed into a columnar shape; the formed article is dried; plugging portions are formed in the cells; and firing the article to obtain the honeycomb segment.

The kneading method, the method for forming the kneaded clay into a columnar shape, and the drying method are not particularly limited. As the kneading method, there is a method using a kneader or a vacuum kneader. As the method for forming the kneaded clay into a columnar shape, there may be employed a conventionally known forming method such as extrusion forming, injection forming, and press forming. Of these, preferable is a method of extrusion forming using a honeycomb structure-forming die capable of imparting desired outer wall thickness, partition wall thickness, and cell density to the kneaded clay. Further, as the drying method, there may be employed a conventionally known drying method such as hot air drying, microwave drying, dielectric drying, reduced pressure drying, vacuum drying, and freeze drying. Of these, it is preferable to employ a drying method of a combination of hot air drying with microwave drying or dielectric drying in that the whole article can be dried quickly and uniformly. The drying conditions can suitably be selected according to the material for the honeycomb segment and the like.

As a method for forming plugging portions in the cells, a conventionally known method can be employed. More specifically, after a sheet is applied on the end face, holes are made in positions corresponding with the cells where plugging portions are formed of the sheet. At the state that the sheet is applied, and the end face is immersed in plugging slurry to fill the slurry into the opening end portions of the cells where the plugging portions are to be formed, followed by drying and firing. Incidentally, the plugging slurry means a slurried plugging material. The plugging is preferably performed by the use of the same material as that for the honeycomb segment in order to reduce thermal expansion difference between the plugging portions and the honeycomb segment.

As a firing method, for example, there is a method where firing is performed in a firing furnace. The firing furnace and the firing conditions can suitably be selected according to the shape, material, and the like of the honeycomb segment. Organic matter such as a binder may be combusted and removed by calcination before firing. Incidentally, though the firing may be performed before the plugging slurry is filled or after the plugging slurry is filled, the firing is preferably performed after the plugging slurry is filled. This is because carbon dioxide generated and the costs in the thermal treatment step or the like can be reduced by reducing the number of the thermal treatment steps for one time.

(Method for Preparing Bonding Material)

The bonding material can be prepared by, for example, adding, as necessary, a dispersant, water, and the like to the constituents of the bonding material and mixing and kneading them by the use of a kneader such as a mixer to obtain a paste.

(Method for Manufacturing Periphery-Ground Article)

The periphery-ground article can be manufactured by grinding the outer peripheral portion of the bonded article. The outer peripheral portion to be ground is preferably for two cells or more from the outermost peripheral cell, more preferably for 2 to 4 cells. By grinding in this manner, the honeycomb filter of the present invention can have an arbitrary shape, and deformed cells present in the outer peripheral portion can be removed.

There is no particular limitation on the grinding method, and a conventionally known method can be employed. For example, a method described in Japanese Patent No. 2604876 official bulletin. More specifically, it is preferable to set a peripheral speed of the grinding stone to 750 to 2100 m/min., preferably 1300 to 1500 m/min., and a machining speed of 0.7 to 0.9 mm/sec. When the peripheral speed of the grinding stone is below 750 m/min., time required for the grinding is long, which may raise the production costs unnecessarily. On the other hand, when the peripheral speed of the grinding stone is above 2100 m/min. chipping may be caused to fail to obtain desired size accuracy. When the machining speed is below 0.7 mm/sec., machining time may increase. On the other hand, when it is above 0.9 mm/sec., chipping may be caused to shorten the life of the grinding stone.

(2-2) Step (2)

The step (2) is a step where the catalyst-carrying article is obtained by loading the catalyst on the partition wall of the periphery-ground article. An example of a method for loading a catalyst on the partition walls of the periphery-ground article is the following method. In the first place, a desired catalyst is dispersed in a dispersion medium such as water to prepare a catalyst-carrying liquid. Next, by immersing the periphery-ground article in the catalyst-carrying liquid to load the catalyst on the partition walls present in the periphery-ground article.

(2-3) Step (3)

The step (3) is a step where an outer peripheral coat layer is disposed on the outer peripheral coat layer on the outer peripheral face of the catalyst-carrying article to obtain an outer periphery-coated article. The method for disposing the outer peripheral coat layer is not particularly limited, and a conventionally known method can be used. For example, there is a method where the outer peripheral face is covered with a coating material. By performing the step (3) after the step (2), the catalyst hardly deposits in the outer peripheral coat layer, and the catalyst hardly aggregates on the partition wall separating and forming the outermost periphery. Therefore, production costs can be reduced.

(2-4) Step (4)

The step (4) is a step where the outer periphery-coated article is heated to fix the catalyst on the partition walls. Though the step (4) can be performed by heating the catalyst-carrying article right after the step (2), it is preferably performed after the step (3) because carbon dioxide generated and the production costs can be reduced by reducing the number of the thermal treatment steps for one time.

(3) Others

Figure 4:
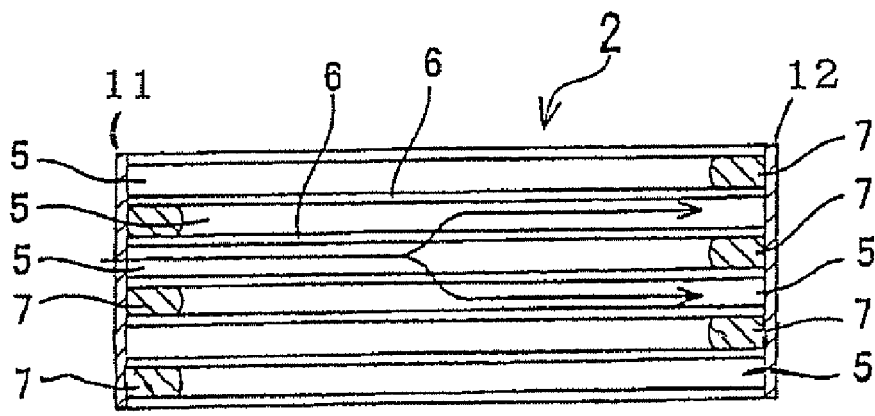
FIG. 4 is a cross-sectional view along the A-A line in FIG. 3.

Here, an embodiment of a fluid when the honeycomb filter of the present invention is used will be described using FIG. 4. FIG. 4 is a cross-sectional view along the A-A line of FIG. 3. FIG. 4 shows a case where the left side end face 11 of the honeycomb segment 2 serves as the inlet of exhaust gas (fluid) and where the right side end face 12 serves as the outlet of exhaust gas. The exhaust gas flows into the honeycomb segment 2 from the cells 5 (inflow cells) opening without plugging portion, passes through the porous partition walls 6, and flows out from the other cells 5 (outflow cells) opening without plugging portions. When the exhaust gas passes through the partition walls 6, PM including soot in the exhaust gas is trapped by the partition walls 6. Thus, the exhaust gas can be purified. By such trapping, PM including soot deposits inside the honeycomb segment 2 with the passage of time to increase pressure loss. Therefore, it is necessary to regenerate the DPF by combusting PM.

Example

The present invention is described in detail below by way of examples. Note that the present invention is not limited to the following examples. The methods of measuring and evaluating various properties were as follows.

[Porosity (%)]: The porosity was calculated from the pore capacity.

[Evaluation on catalyst and amount of loaded catalyst (mass %) on outer peripheral coat layer]: The measurement piece obtained by embedding a resin prepared by mixing "SpeciFix (Epoxy Type Resin)" (trade name) produced by Struers A/C and "SpeciFix-20 (Resin Hardner)" (trade name) produced by Struers A/C and curing the mixture in the boundary portion between the catalyst-carrying article and the outer peripheral coat layer was evaluated by an analysis using the energy dispersive fluorescent X-ray (trade name of "EMAX-5770W" produced by Horiba, Ltd.) using a scanning electron microscope (trade name of "S-3200N" produced by Hitachi, Ltd.). The pieces where no catalyst was detected in the outer peripheral coat layer at a position 50 μm or more apart from the boundary face were marked by "absent", and the pieces where a catalyst was detected there were marked by "present". In addition, the amount of the catalyst loaded on the outer peripheral coat layer was measured by subjecting the Ce content to a quantitative analysis.

[Evaluation for crack generation]: Crack generation was evaluated by eye observation. The pieces having crack generation were marked by "present", and the pieces having no crack generation were marked by "absent".

Example 1

Using a mixture of a SiC power and a metal Si powder at the mass ratio of 80:20 as the material for the honeycomb segment, starch and a resin balloon were added as pore formers, and methyl cellulose, hydroxyproxylmethyl cellulose, a surfactant, and water were further added to the mixture, followed by kneading to prepare kneaded clay having plasticity.

The kneaded clay was subjected to extrusion forming by the use of a die for forming a honeycomb structure having a cell structure of 12 mil/300 cpsi ([0.3 mm]/[46.5 cells/cm$^2$]) and then dried. Then, plugging portions were formed in the cells, followed by firing to obtain prismatic columnar honeycomb segments.

A pasty bonding material was applied on the outer wall of each of the sixteen prismatic columnar honeycomb segments obtained above, and, after the sixteen prismatic columnar honeycomb segments were arranged in four by four, pressure was applied from four directions. Then, the bonding material was dried to obtain a bonding article. After drying the bonding material, the bonding article was ground into a columnar shape to obtain a periphery-ground article.

A catalyst was loaded on the ground article and dried at 150° C. to obtain a catalyst-carrying article. As the catalyst, there was used a mixture of alumina, platinum, and ceria at a mass ratio of 8:1.7:2. Incidentally, the catalyst was prepared so that the whole honeycomb filter has a uniform desired concentration.

After the outer peripheral coat layer was disposed to have a thickness of 1 mm using silicon carbide on the outer peripheral face of the catalyst-carrying article, the catalyst was dried at 550° C. and fixed on the partition walls to obtain a columnar honeycomb filter. The size of the whole honeycomb filter was 144 mm (diameter)×152 mm (length). The "evaluation of presence of the catalyst in the outer peripheral coat layer" was "absent", the "amount of a catalyst in the outer peripheral coat layer" was 0 mass %, and the "evaluation of crack generation" was "absent".

Examples 2 to 9, Examples 11 to 13

Columnar honeycomb filters were manufactured in the same manner as in Example 1 except for the conditions shown in Table 1. Each of the honeycomb filters was evaluated for the "catalyst in the outer peripheral coat layer" and the "crack generation". The results are shown in Table 1.

Example 10

A columnar honeycomb filter was manufactured in the same manner as in Example 1 except that pressure was applied with placing a control plate from the inlet side end face to the position of 5 mm when the prepared kneaded clay is subjected to extrusion forming to make the cell shape on the inlet side octagonal and the cell shape on the outlet side quadrangular. The honeycomb filter was evaluated for the "catalyst in the outer peripheral coat layer" and the "crack generation". The results are shown in Table 1.

TABLE 1

| | Material | Porosity (%) | Cell structure | Outer peripheral coat layer thickness (mm) | Catalyst concentration (g/L) | Catalyst in outer peripheral coat layer Presence | Catalyst in outer peripheral coat layer Amount (mass %) | Crack generation |
|---|---|---|---|---|---|---|---|---|
| Example 1 | Silicon carbide | 40 | 12 mil/300 cpsi | 1 | 30 | Absent | 0 | Absent |
| Example 2 | Silicon carbide | 50 | 12 mil/300 cpsi | 1 | 30 | Absent | 0 | Absent |
| Example 3 | Silicon carbide | 60 | 12 mil/300 cpsi | 1 | 30 | Absent | 0 | Absent |
| Example 4 | Silicon carbide | 70 | 12 mil/300 cpsi | 1 | 30 | Absent | 0 | Absent |
| Example 5 | Silicon carbide | 50 | 12 mil/300 cpsi | 0.5 | 30 | Absent | 0 | Absent |
| Example 6 | Silicon carbide | 50 | 12 mil/300 cpsi | 1.5 | 30 | Absent | 0 | Absent |
| Example 7 | Silicon carbide | 50 | 12 mil/300 cpsi | 1 | 15 | Absent | 0 | Absent |
| Example 8 | Silicon carbide | 50 | 12 mil/300 cpsi | 1 | 50 | Absent | 0 | Absent |
| Example 9 | Silicon carbide | 50 | 17 mil/200 cpsi | 1 | 30 | Absent | 0 | Absent |
| Example 10 | Silicon carbide | 50 | 15 mil/160 cpsi (Octagonal and quadrangular cells) | 1 | 30 | Absent | 0 | Absent |
| Example 11 | Cordierite | 50 | 12 mil/300 cpsi | 1 | 30 | Absent | 0 | Absent |
| Example 12 | Aluminum titanate | 50 | 12 mil/300 cpsi | 1 | 30 | Absent | 0 | Absent |
| Example 13 | Mullite | 50 | 12 mil/300 cpsi | 1 | 30 | Absent | 0 | Absent |

Comparative Example 1

The same method as in Example 1 was performed until a periphery-ground article was obtained. After the outer peripheral coat layer was disposed to have a thickness of 1 mm using silicon carbide on the outer peripheral face of the periphery-ground article, the catalyst was loaded. After the catalyst was dried at 15° C. to obtain an outer periphery-coated article, the catalyst was fixed by heating the outer periphery-coated article at 550° C. to obtain a columnar honeycomb filter. The "presence of the catalyst in the outer peripheral coat layer" was "present", the "amount of the catalyst in the outer peripheral coat layer" was 7 mass %, and the "crack generation" was "present".

Comparative Examples 2 to 9, Comparative Examples 11 to 13

Columnar honeycomb filters were manufactured in the same manner as in Comparative Example 1 except for the conditions shown in Table 2. The honeycomb filters were evaluated for the "catalyst in the outer peripheral coat layer" and the "crack generation". The results are shown in Table 2.

Comparative Example 10

A columnar honeycomb filter was manufactured in the same manner as in Example 1 except that pressure was applied with placing a control plate from the inlet side end face to the position of 5 mm when the prepared kneaded clay is subjected to extrusion forming to make the cell shape on the inlet side octagonal and the cell shape on the outlet side quadrangular. The honeycomb filter was evaluated for the "catalyst in the outer peripheral coat layer" and the "crack generation". The results are shown in Table 2.

TABLE 2

| | Material | Porosity (%) | Cell structure | Outer peripheral coat layer thickness (mm) | Catalyst concentration (g/L) | Catalyst in outer peripheral coat layer Presence | Catalyst in outer peripheral coat layer Amount (mass %) | Crack generation |
|---|---|---|---|---|---|---|---|---|
| Comp. Ex. 1 | Silicon carbide | 40 | 12 mil/300 cpsi | 1 | 30 | Present | 7 | Present |
| Comp. Ex. 2 | Silicon carbide | 50 | 12 mil/300 cpsi | 1 | 30 | Present | 7 | Present |
| Comp. Ex. 3 | Silicon carbide | 60 | 12 mil/300 cpsi | 1 | 30 | Present | 7 | Present |
| Comp. Ex. 4 | Silicon carbide | 70 | 12 mil/300 cpsi | 1 | 30 | Present | 7 | Present |
| Comp. Ex. 5 | Silicon carbide | 50 | 12 mil/300 cpsi | 0.5 | 30 | Present | 7 | Present |
| Comp. Ex. 6 | Silicon carbide | 50 | 12 mil/300 cpsi | 1.5 | 30 | Present | 7 | Present |
| Comp. Ex. 7 | Silicon carbide | 50 | 12 mil/300 cpsi | 1 | 15 | Present | 7 | Present |
| Comp. Ex. 8 | Silicon carbide | 50 | 12 mil/300 cpsi | 1 | 50 | Present | 7 | Present |
| Comp. Ex. 9 | Silicon carbide | 50 | 17 mil/200 cpsi | 1 | 30 | Present | 7 | Present |
| Comp. Ex. 10 | Silicon carbide | 50 | 15 mil/160 cpsi (Octagonal and quadrangular cells) | 1 | 30 | Present | 7 | Present |
| Comp. Ex. 11 | Cordierite | 50 | 12 mil/300 cpsi | 1 | 30 | Present | 7 | Present |
| Comp. Ex. 12 | Aluminum titanate | 50 | 12 mil/300 cpsi | 1 | 30 | Present | 7 | Present |
| Comp. Ex. 13 | Mullite | 50 | 12 mil/300 cpsi | 1 | 30 | Present | 7 | Present |

In the honeycomb filters of the present invention, crack generation were hardly caused, and the catalyst were hardly observed in the outer peripheral coat layer. In addition, the catalyst hardly aggregated on the partition walls separating and forming the outermost peripheral cells.

INDUSTRIAL APPLICABILITY

The honeycomb filter of the present invention can be used as a filter for exhaust gas. For example, it can suitably be used as a diesel particulate filter (DPF) for trapping and removing particulate matter (PM) contained in exhaust gas from a diesel engine or the like.

The invention claimed is:

1. A honeycomb filter comprising:

a catalyst-carrying article where a plurality of honeycomb segments each is provided with a sell structure having a plurality of cells separated and formed by porous partition walls and an outer wall disposed in the outer periphery of the cell structure constitute a bonded article obtained by bonding the plurality of honeycomb segments at the outer wall and where a catalyst is loaded on the partition walls of a periphery-ground article obtained by grinding an outer peripheral portion of the bonded article, and an outer peripheral coat layer disposed on an outer peripheral face of the catalyst carrying article;

wherein an amount of the catalyst loaded in the outer peripheral coat layer at a position 50 μm or more apart from a boundary face between the catalyst-carrying article and the outer peripheral coat layer is 5 mass % or less, mass % being a percentage of a mass of the catalyst in the outer peripheral coat layer, when a measurement piece having a cross section where a boundary portion between the catalyst-carrying article and the outer peripheral coat layer can be observed and being obtained by embedding a resin in the boundary portion in the cross section is measured by an energy dispersive fluorescent X-ray analysis using a scanning electron microscope.

2. The honeycomb filter according to claim 1 wherein the amount of the catalyst loaded in the outer peripheral coat layer at a position 50 μm or more apart from the boundary face is 1 mass % or less, mass % being a percentage of a mass of the catalyst in the outer peripheral coat layer, when the amount of catalyst loaded in the measurement piece is measured by the energy dispersive fluorescent X-ray analysis using a scanning electron microscope.

3. The honeycomb filter according to claim 1 wherein no catalyst is detected in the outer peripheral coat layer at a position 50 μm or more apart from the boundary face when the amount of catalyst loaded in the measurement piece is measured by the energy dispersive fluorescent X-ray analysis using a scanning electron microscope.

4. The honeycomb filter according to claim 1 wherein a ratio of an amount of the catalyst in the range within 50 μm from the boundary face of the catalyst-carrying article and the outer peripheral coat layer of the partition walls separating and forming the cells in an outermost periphery to an amount of the catalyst in the partition walls separating and forming the cells other than the cells in the outermost periphery is below 30 mass %.

* * * * *